(12) United States Patent
Chen

(10) Patent No.: US 7,224,095 B2
(45) Date of Patent: May 29, 2007

(54) BALANCING STRUCTURE FOR MOTOR

(75) Inventor: Ming-Huang Chen, Kaohsiung (TW)

(73) Assignee: Dahlia Technology Corp., Kaohsiung (TW)

( * ) Notice: Subject to any disclaimer, the term of this patent is extended or adjusted under 35 U.S.C. 154(b) by 80 days.

(21) Appl. No.: 11/126,224

(22) Filed: May 11, 2005

(65) Prior Publication Data

US 2006/0181160 A1    Aug. 17, 2006

(30) Foreign Application Priority Data

Feb. 14, 2005    (TW) .............................. 94104215 A (51) Int. Cl.
*H02K 7/04* (2006.01)
*H02K 5/24* (2006.01)

(52) U.S. Cl. ....................... 310/190; 310/51; 310/67 R (58) Field of Classification Search .................. 310/51, 310/186, 190

See application file for complete search history.

(56) References Cited

U.S. PATENT DOCUMENTS

| | | | |
|---|---|---|---|
| 6,013,965 A * | 1/2000 | Suzuki et al. ................ | 310/186 |
| 6,097,120 A | 8/2000 | Horng | |
| 6,242,826 B1 * | 6/2001 | Saito et al. .................... | 310/51 |
| 6,384,505 B1 * | 5/2002 | Horng et al. ................ | 310/186 |
| 6,400,053 B1 * | 6/2002 | Horng .......................... | 310/91 |
| 6,483,209 B1 | 11/2002 | Horng et al. | |
| 6,700,241 B1 * | 3/2004 | Horng et al. ............. | 310/67 R |
| 6,727,626 B2 | 4/2004 | Horng et al. | |
| 2005/0006962 A1 | 1/2005 | Horng | |
| 2006/0232149 A1 * | 10/2006 | Horng et al. ............. | 310/68 B |
| 2006/0232150 A1 * | 10/2006 | Horng et al. ............. | 310/68 B |

FOREIGN PATENT DOCUMENTS

| | | |
|---|---|---|
| TW | 383818 | 3/2000 |
| TW | 422365 | 2/2001 |
| TW | 428838 | 4/2001 |
| TW | M241969 | 8/2004 |

* cited by examiner

*Primary Examiner*—Burton Mullins
(74) *Attorney, Agent, or Firm*—Bacon & Thomas, PLLC (57) ABSTRACT

A motor includes a fixed portion, a rotor, and at least one balancing plate fixed on the fixed portion. The fixed portion includes a stator having at least one pole plate that extends to form a plurality of pole faces, with a gap being defined between a pair of the pole faces adjacent to each other. The rotor includes a shaft and an annular magnet facing the pole faces. The balancing plate includes at least two magnetically conductive faces respectively aligned with the gaps. Each magnetically conductive face includes a length not smaller than that of an associated gap. The pole faces face at least one face of the annular magnet. When the rotor turns, the annular magnet of the rotor induces the alternating magnetic fields created by the stator and attracts the magnetically conductive faces to thereby maintain rotational balance of the rotor.

22 Claims, 10 Drawing Sheets

BALANCING STRUCTURE FOR MOTOR

BACKGROUND OF THE INVENTION

1. Field of the Invention

The present invention relates to a balancing structure for a motor. In particular, the present invention relates to a balancing structure for maintaining stable rotation of a rotor of a motor.

2. Description of Related Art

A wide variety of structures for maintaining rotational balance for a rotor of a motor have been proposed. One of these structures comprises a fixed portion, a rotor, an attracting portion, and a magnetically conductive portion. The fixed portion includes a base, an axial tube fixed on the base, a bearing received in the axial tube, a stator, and a circuit board. The stator includes a coil with axial winding or radial winding and a plurality of pole plates (or pole arms). The rotor includes a shaft rotatably extending through the bearing and an annular magnet surrounding the pole faces of the pole plates. The attracting portion is provided on a bottom of the rotor or a top end of the axial tube. Alternatively, the attracting portion is provided by the annular magnet or the alternating magnetic fields created by the pole plates of the stator. The magnetically conductive portion is made of a magnetically conductive material and may be comprised of a disc with two arcuate edges, a casing fixed in a rotor housing of the rotor, an annular plate, a plurality of arcuate plates, or a rotor housing of a spindle motor. The magnetically conductive portion may be provided on the circuit board, an inner periphery of the rotor, or the bottom of the rotor, and associated with the attracting portion. Such a structure is disclosed in, e.g., Taiwan Utility Model Publication Nos. 383818, 422365, 428838, and M241969, U.S. Pat. Nos. 6,097,120; 6,483,209; 6,700,241; and 6,727,626, and U.S. Patent Publication No. 2005/0006962.

When the motor turns, alternating magnetic fields are created by the pole faces of the magnetic pole plates (or pole arms). The magnetically conductive portion is attracted by the attracting portion during rotation of the rotor, thereby maintaining rotational balance of the rotor, avoiding disengagement of the rotor shaft from the stator, reducing rotational friction of the bearing, and prolonging the life of the motor.

It is common to make the size of the metal plate consisting of the magnetically conductive portion as large as possible so as to provide a large area facing the magnet of the attracting portion (such as the annular magnet). This may result in excessive attracting force between the magnetically conductive portion and the attracting portion for balancing the rotor. In a case that the attracting portion is provided by the annular magnet and the magnetically conductive portion is provided on the fixed portion, the magnetically conductive portion often extends across the alternating magnetic fields created by the pole faces of the stator, adversely affecting the alternating magnetic fields and lowering the rotational efficiency of the rotor. On the other hand, alternating magnetic fields do not exist in the gap between two adjacent pole faces. Thus, it is most desirable to provide the attracting portion in the gap. However, none of the conventional designs provides the attracting portion in the gap. At best, the gap is covered by an attracting portion with an excessively large area, leading to unsatisfactory balancing effect for the rotor.

OBJECTS OF THE INVENTION

An object of the present invention is to provide a balancing structure for assuring rotational efficiency for a rotor of a motor.

Another object of the present invention is to provide a balancing structure for obtaining stable starting of a rotor of a motor.

A further object of the present invention is to provide a balancing structure for maintaining stable rotation of a rotor of a motor.

SUMMARY OF THE INVENTION

A motor in accordance with the present invention includes a fixed portion, a rotor, and at least one balancing plate. The fixed portion includes a stator having at least one winding and at least one pole plate. The at least one pole plate extends to form a plurality of pole faces, with a gap being defined between a pair of the pole faces adjacent to each other. The at least one winding is energizable to make the pole faces create alternating magnetic fields.

The rotor includes a shaft and an annular magnet. The shaft rotatably extends through the fixed portion, and the annular magnet is mounted to an inner periphery of the rotor and face the pole faces of the stator.

The at least one balancing plate is mounted on the fixed portion. The at least one balancing plate includes at least two magnetically conductive faces that are respectively aligned with the gaps of the stator and that are spaced from each other. Each magnetically conductive face includes a length not smaller than that of an associated one of the gaps. The pole faces face at least one face of the annular magnet.

When the rotor turns, the annular magnet of the rotor induces the alternating magnetic fields created by the stator and attracts the at least two magnetically conductive faces to thereby maintain rotational balance of the rotor.

In an embodiment of the invention, the fixed portion includes an axial tube, and the at least one balancing plate is a disc with a central hole and mounted around the axial tube. Preferably, the at least two magnetically conductive faces extend from a circumference of the disc and face the inner periphery of the annular magnet.

Preferably, the fixed portion further includes a circuit board with an underside, and the at least one balancing plate is in intimate contact with the underside or a top side of the circuit board.

Preferably, each magnetically conductive face extends across an associated one of the gaps and two mutually facing ends respectively of an associated pair of the pole faces adjacent to each other, with an associated one of the gaps being delimited between the two mutually facing ends.

Preferably, a length of each magnetically conductive face overlaps with an associated pair of the pole faces delimiting the associated gap by a first overlapped length and a second overlapped length. At least one of the first overlapped length and the second overlapped length is smaller than ½ of an overall length of each pole face.

In another embodiment of the invention, the at least one balancing plate includes a plurality of notches aligned with the pole faces, and the at least one balancing plate includes a plurality of extensions respectively aligned with the gaps of the stator. Preferably, the magnetically conductive faces are respectively located on upper faces of distal ends of the extensions, and the magnetically conductive faces face a bottom face of the annular magnet of the rotor. Preferably, each magnetically conductive face extends across an associated one of the gaps and two mutually facing ends respectively of an associated pair of the pole faces adjacent to each other, with an associated one of the gaps being delimited between the two mutually facing ends.

In a further embodiment of the invention, at least two balancing plates are used. Each of the at least two balancing plates is U-shaped and includes an inner magnetically conductive face, an outer magnetically conductive face, and a lower magnetically conductive face. Preferably, the fixed portion includes a circuit board or a base. The at least two balancing plates are mounted on the circuit board or the base and respectively aligned with the gaps of the stator. The inner magnetically conductive face, the outer magnetically conductive face, and the lower magnetically conductive face of each of the at least two balancing plates respectively face the inner periphery, an outer periphery, and a bottom face of the annular magnet of the rotor.

Preferably, each of the inner magnetically conductive face, the outer magnetically conductive face, and the lower magnetically conductive face of each of the at least two balancing plates extend across an associated one of the gaps and two mutually facing ends respectively of an associated pair of the pole faces adjacent to each other, with an associated one of the gaps being delimited between the mutually facing ends.

Preferably, a length of each of the inner magnetically conductive face, the outer magnetically conductive face, and the lower magnetically conductive face of each of the at least two balancing plates overlaps with an associated pair of the pole faces delimiting the associated gap by a first overlapped length and a second overlapped length, at least one of the first overlapped length and the second overlapped length being smaller than ½ of an overall length of each pole face.

In still another embodiment of the invention, each of the at least two balancing plates are rectangular and has an upper side on which the magnetically conductive faces are formed. Preferably, the fixed portion includes a circuit board or a base. The at least two balancing plates are mounted on the circuit board or the base and respectively aligned with the gaps of the stator, with the magnetically conductive faces facing a bottom face of the annular magnet of the rotor.

Preferably, each of the at least two balancing plates extends across an associated one of the gaps and two mutually facing ends respectively of an associated pair of the pole faces adjacent to each other, with an associated one of the gaps being delimited between the mutually facing ends.

Preferably, a length of each of the at least two balancing plates overlaps with an associated pair of the pole faces delimiting the associated gap by a first overlapped length and a second overlapped length, at least one of the first overlapped length and the second overlapped length being smaller than ½ of an overall length of each pole face.

The stator may include radial winding or axial winding.

Other objects, advantages and novel features of this invention will become more apparent from the following detailed description when taken in conjunction with the accompanying drawings.

DETAILED DESCRIPTION OF THE PREFERRED EMBODIMENTS

Figure 1:
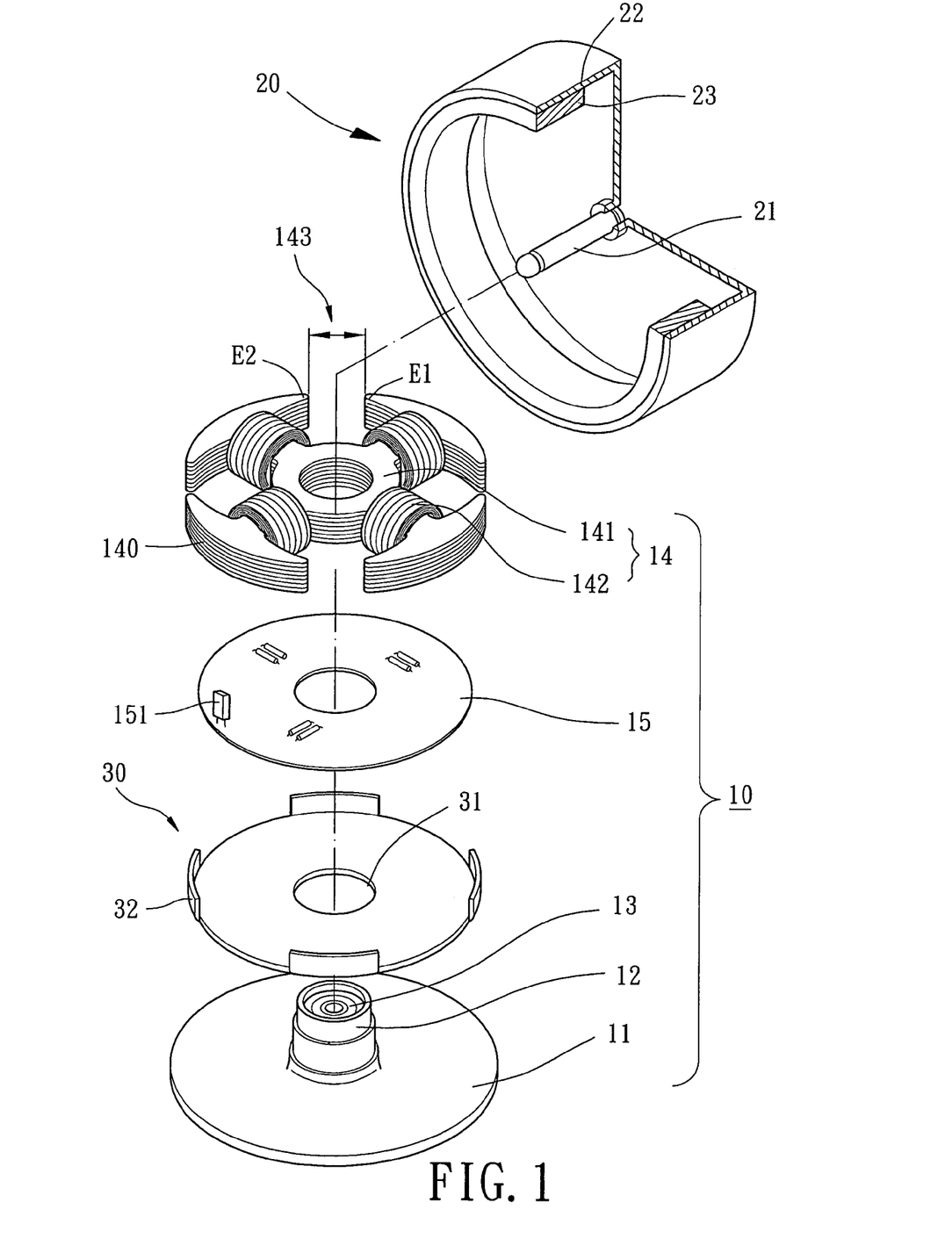
FIG. 1 is an exploded perspective view of a first embodiment of a motor in accordance with the present invention.

Referring to FIG. 1, a first embodiment of a motor in accordance with the present invention comprises a fixed portion 10, a rotor 20, and a balancing plate 30. The motor can be used as a motor for a heat-dissipating fan, a spindle motor for an optical disk drive, etc.

Figure 2:
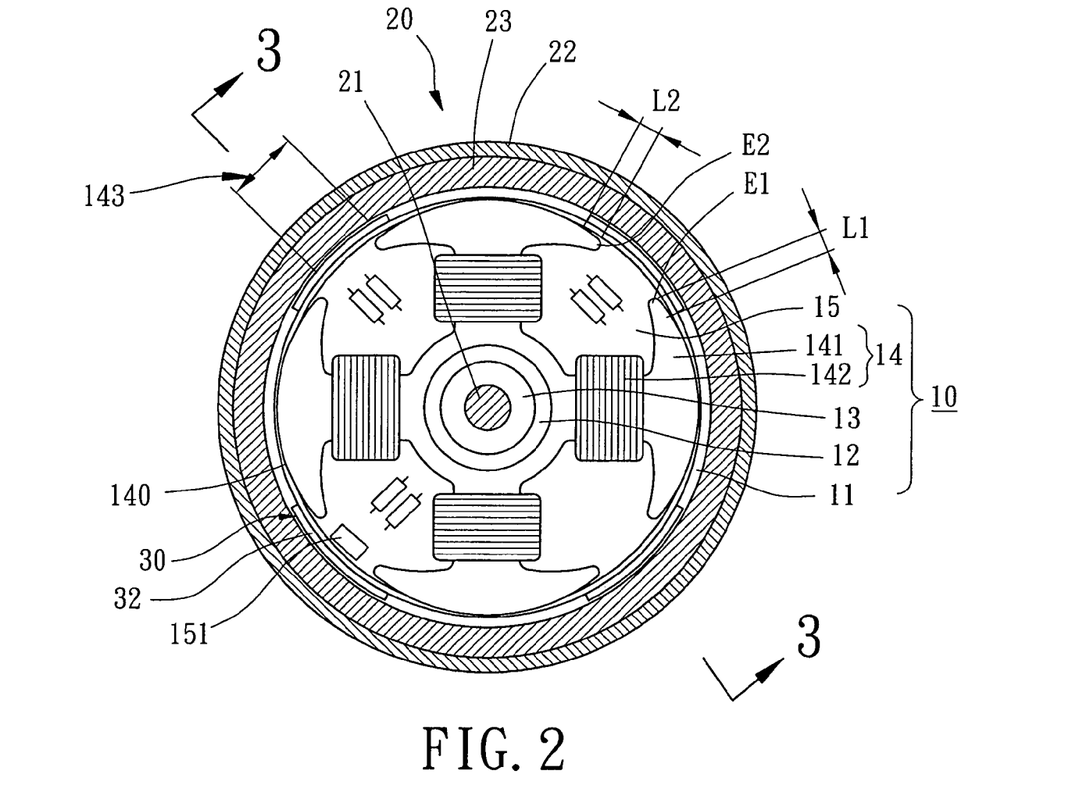
FIG. 2 is a sectional view of the motor in FIG. 1.
Figure 3:
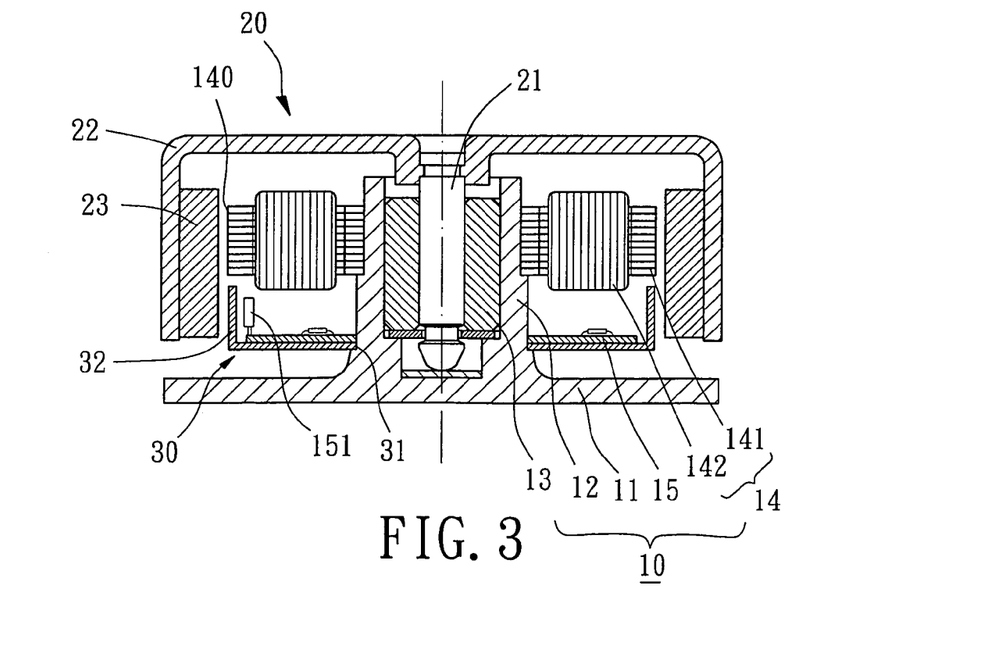
FIG. 3 is a sectional view taken along plane 3—3 in FIG. 2.

Referring to FIGS. 1 through 3, the fixed portion 10 includes a base 11, an axial tube 12, a bearing 13, a stator 14, and a circuit board 15. The base 11 may be coupled to a casing of the motor. The axial tube 12 is fixed on or integrally formed with the base 11. At least one bearing 13 is mounted in the axial tube 12 whereas as the stator 14 and the circuit board 15 are mounted around the axial tube 12. The bearing 13 may be an oily bearing, ball bearing, fluid dynamic bearing, or magnetic bearing.

The stator 14 may be a stator with radial winding. The stator 14 includes at least one pole plate 141 with a winding 142. In the illustrated embodiment, the stator 14 includes four pole plates 141 each having a winding 142 wound therearound along a radial direction. Each pole plate 141 includes a pole face 140, with a gap 143 being defined between two mutually facing ends E1 and E2 respectively of a pair of pole plates 141 adjacent to each other. At least one sensor 151 is mounted on the circuit board 15 for detecting rotational status of the rotor 20. When a control circuit of the circuit board 15 is on, the direction of the electric current of the windings 142 on the pole plates 141 are alternately controlled by the control circuit of the circuit board 15 such that alternating magnetic fields are created by the pole plates 141.

Still referring to FIGS. 1 through 3, the rotor 20 includes a shaft 21, a housing 22, and an annular magnet 23. An end of the shaft 21 is fixed to a center of an end wall of the housing 22, with the other end of the shaft 21 rotatably extending through the bearing 13. The annular magnet 23 is mounted to an inner periphery of the housing 22. The annular magnet 23 includes a plurality of alternately disposed north pole sections (not shown) and south pole sections (not shown) on an inner periphery thereof, with the pole faces 140 facing the north and south pole sections. Thus, alternate energizing of the pole faces 140 drives the rotor 20 to turn.

Still referring to FIGS. 1 through 3, the balancing plate 30 is substantially a disc made of a magnetically conductive material. The balancing plate 30 includes a central hole 31 and at least two magnetically conductive faces 32 (four in this embodiment) extending upward (or downward) from a circumference of the balancing plate 30. The balancing plate 30 is mounted around the axial tube 12 through provision of the central hole 31. The balancing plate 30 is in intimate contact with an underside or a top side of the circuit board 15.

In assembly, the magnetically conductive plates 32 are preferably aligned with the gaps 143 of the stator 14 and face the inner periphery of the annular magnet 23. Each magnetically conductive face 32 has a length not smaller than that of the gap 143. In a case that a span of each magnetically conductive face 32 is greater than the length of the gap 143, the length of the magnetically conductive face 32 is overlapped with a pair of the pole faces 140 of the pole plates 141 delimiting the associated gap 143 by a first overlapped length L1 and a second overlapped length L2 respectively. Preferably, at least one of the first overlapped length L1 and the second overlapped length L2 of each magnetically conductive face 32 is smaller than ½ (more preferably ⅓) of the overall length of each pole face 140. Thus, an appropriate gap is provided between a pair of magnetically conductive faces 32 adjacent to each other. By such an arrangement, adverse affect to the alternate energizing of the pole faces 140 of the stator 14 by excessive affection from the magnetically conductive faces 32 is avoided.

Still referring to FIGS. 2 and 3, after assembly, the magnetically conductive faces 32 of the balancing plate 30 are fixed on the fixed portion and respectively aligned with the gaps 143 of the stator 14 while facing the inner periphery of the annular magnet 23 of the rotor 20. Further, each magnetically conductive face 32 extends across the ends E1 and E2 respectively of a pair of pole faces 140 adjacent to each other and the gap 143 between the ends E1 and E2.

When the motor turns, the inner periphery of the annular magnet 23 continuously induces the alternating magnetic fields created by the pole faces 140 of the stator 14. The magnetic fields of the annular magnet 23 also are continuously attracted to all of the magnetically conductive faces 32 of the balancing plate 30, each of which is arranged to radially face the inner periphery of the annular magnet 23. In particular, the magnetically conductive faces 32 and the annular magnet 23 provide an appropriate magnetically attracting effect for balancing the rotor 20 without adversely affecting the alternate energizing of the stator 14. Shaking, vibration, or wobbling of rotor 20 is avoided while the pole sections of the rotor 20 are passing through the gaps 143. The rotational balance and the rotational stability of the rotor 20 are maintained. Further, when the motor is at rest or at the moment of starting, the inner periphery of the annular magnet 23 still attracts the magnetically conductive faces 32 of the balancing plate 30, avoiding temporary imbalance of the motor at the moment of starting. The starting balance and the starting stability of the rotor 20 are thus improved.

Figure 4:
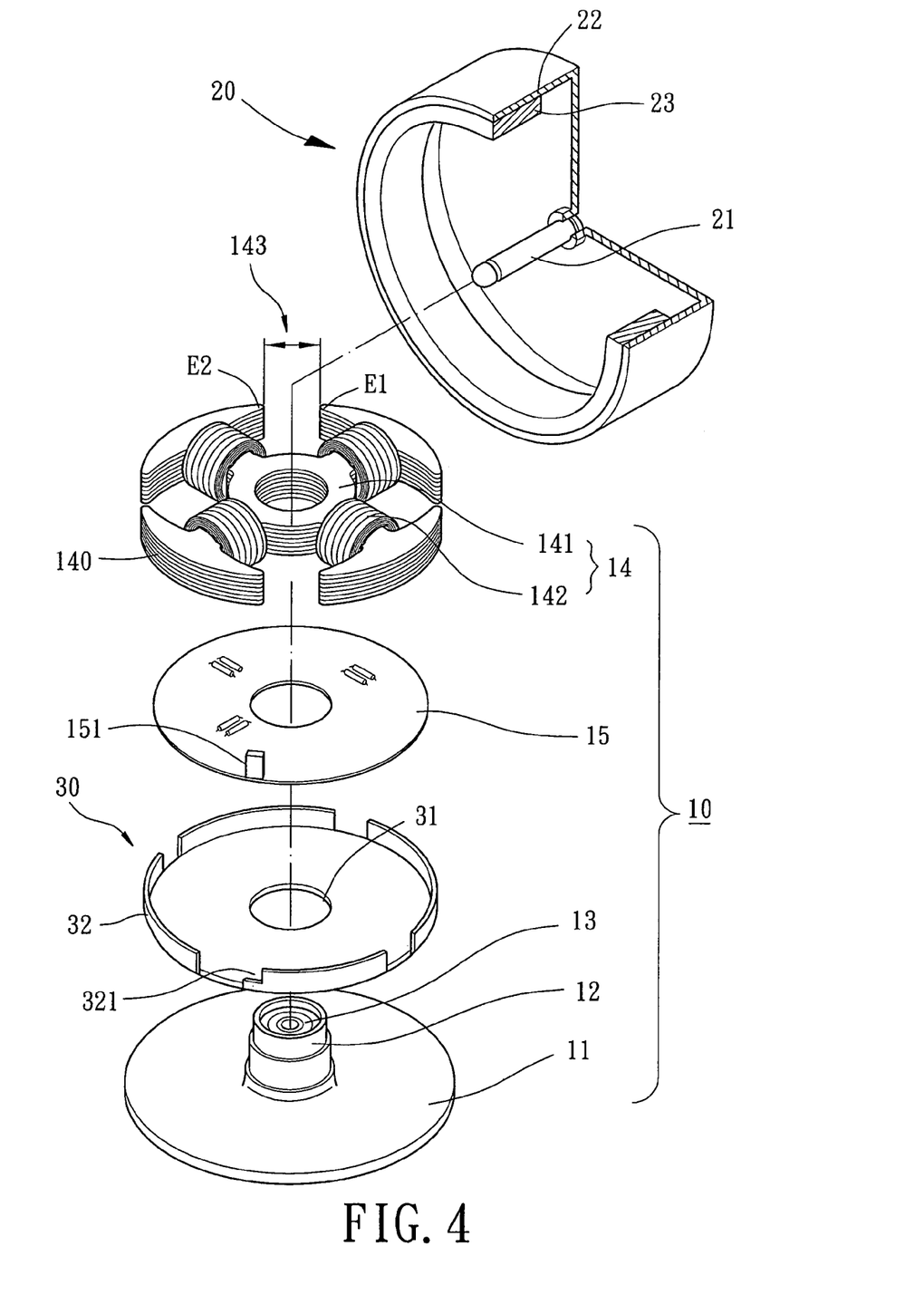
FIG. 4 is an exploded perspective view of a second embodiment of the motor in accordance with the present invention.
Figure 5:
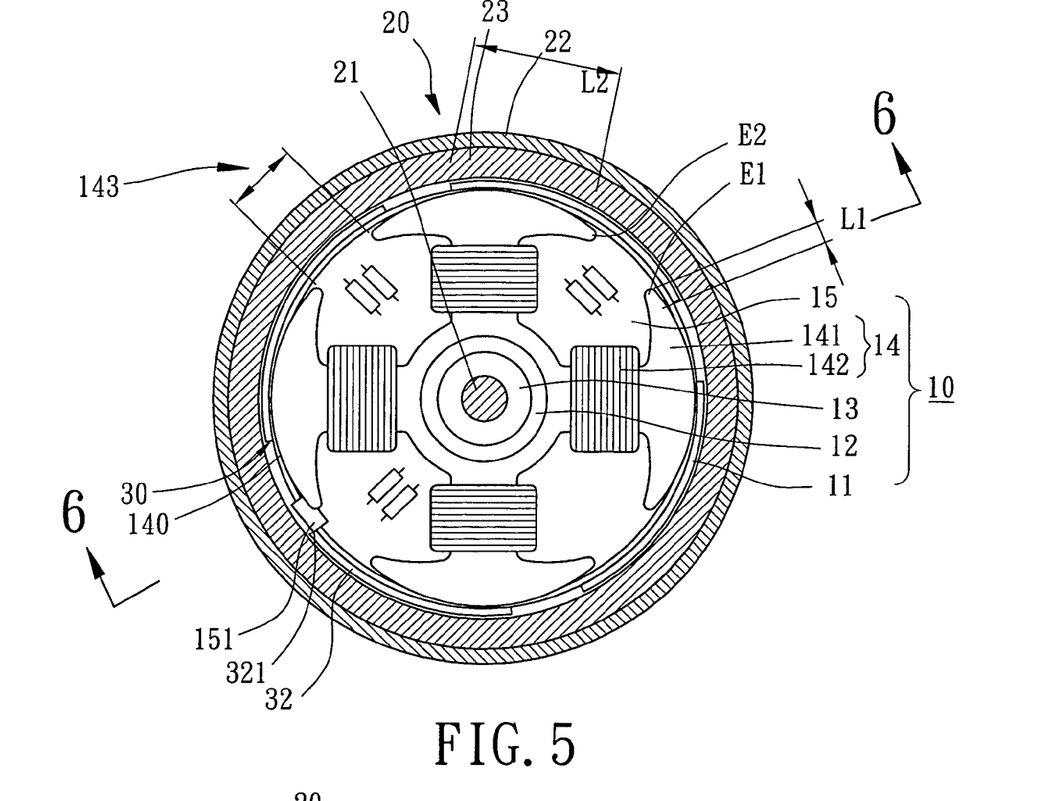
FIG. 5 is a sectional view of the motor in FIG. 4.
Figure 6:
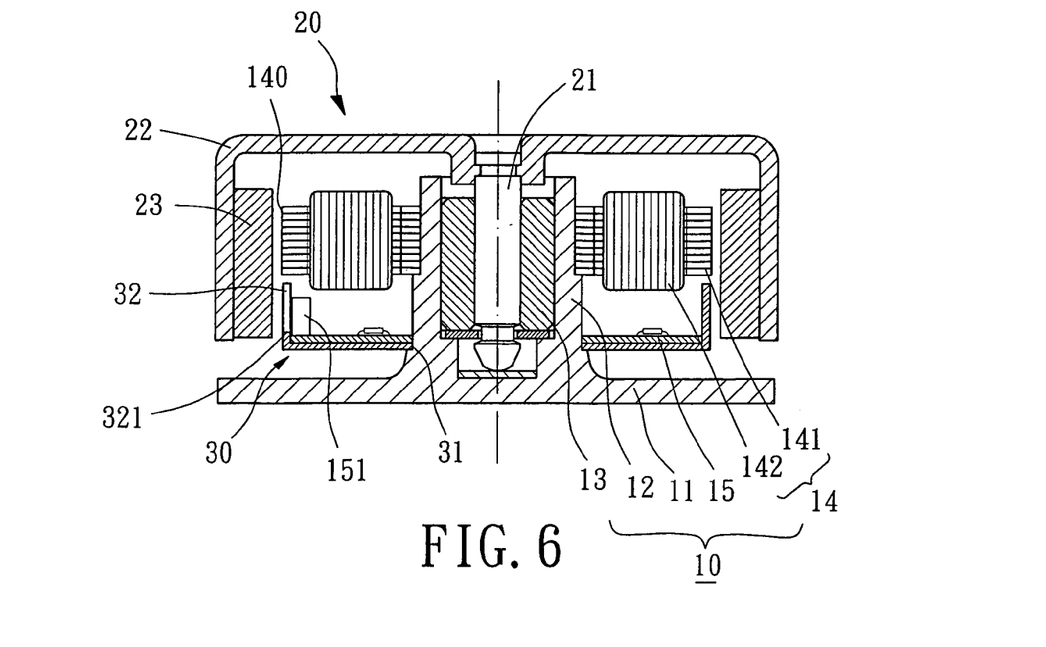
FIG. 6 is a sectional view taken along plane 6—6 in FIG. 5.

FIGS. 4 through 6 illustrate a second embodiment of the invention. In this embodiment, each magnetically conductive face 32 is longer. In particular, one of the overlapped length (e.g., the first overlapped length L1) is preferably smaller than ½ (more preferably ⅓) of the overall length of the pole faces 140. Further, the other overlapped length (e.g., the second overlapped length) L2 is greater than ½ of the overall length of the pole faces 140. This embodiment provides advantages similar to those provided by the first embodiment. Further, at least one of the magnetically conductive face 32 includes a notch 321. In assembly, the sensor 151 of the circuit board 150 is preferably aligned with the notch 321. When the rotor 20 turns, the sensor 151 detects the change of magnetism by the angular position of the notch 321 and a signal is output to the control circuit of the circuit board 15.

Figure 7:
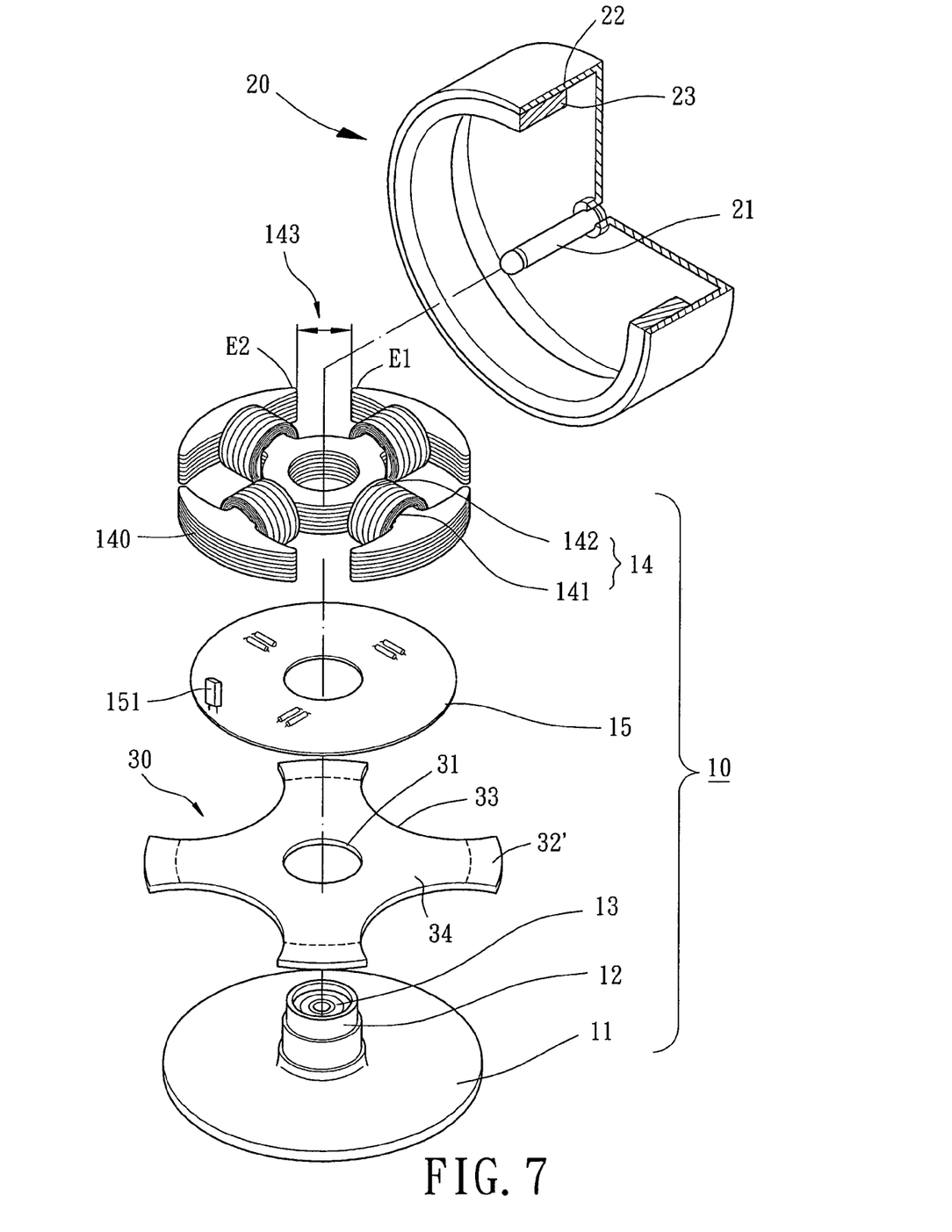
FIG. 7 is an exploded perspective view of a third embodiment of the motor in accordance with the present invention.
Figure 8:
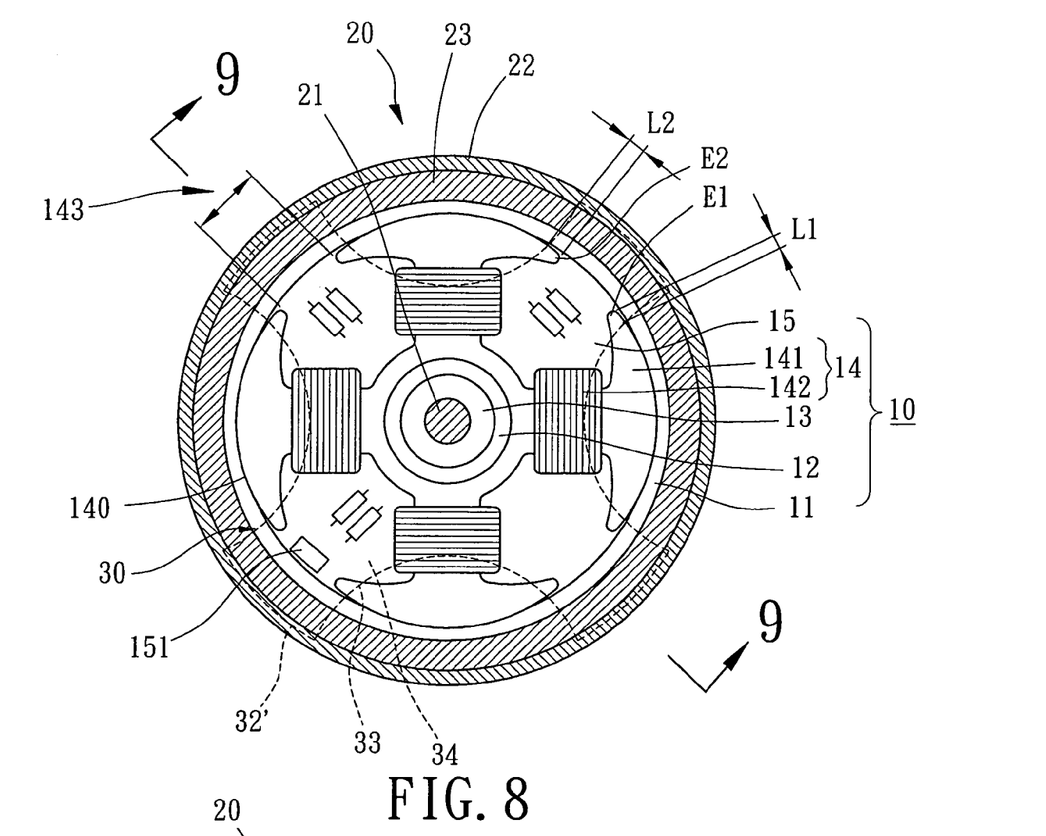
FIG. 8 is a sectional view of the motor in FIG. 7.
Figure 9:
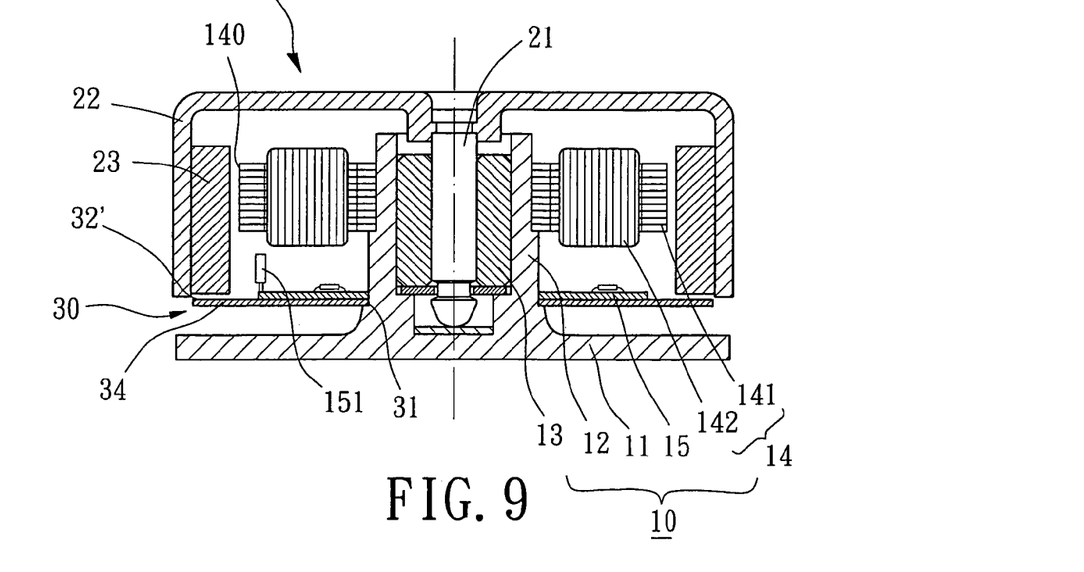
FIG. 9 is a sectional view taken along plane 9—9 in FIG. 8.

FIGS. 7 through 9 illustrates a third embodiment of the invention, wherein the balancing plate 30 includes a plurality of notches 33 respectively aligned with the pole faces 140. Further, the balancing plate 30 includes a plurality of extensions 34 respectively aligned with the gaps 143 of the stator 14. Each extension 34 has a magnetically conductive face 32' on an upper face of a distal end thereof. In assembly, the balancing plate 30 is in intimate contact with an underside of a top side of the circuit board 15.

In assembly, each magnetically conductive face 32' is aligned with an associated gap 143 of the stator 14 and faces a bottom face of the annular magnet 23. Further, each magnetically conductive face 32' has a length not smaller than that of the gap 143. In a case that a span of each magnetically conductive face 32' is greater than the length of the gap 143, the length of the magnetically conductive face 32' is overlapped with a pair of the pole faces 140 of the pole plates 141 delimiting the associated gap 143 by a first overlapped length L1 and a second overlapped length L2 respectively. Preferably, at least one of the first overlapped length L1 and the second overlapped length L2 of each magnetically conductive face 32' is smaller than ½ (more preferably ⅓) of the overall length of each pole face 140. Thus, an appropriate gap is provided between a pair of magnetically conductive faces 32' adjacent to each other. This embodiment provides advantages similar to those provided by the first embodiment.

Figure 10:
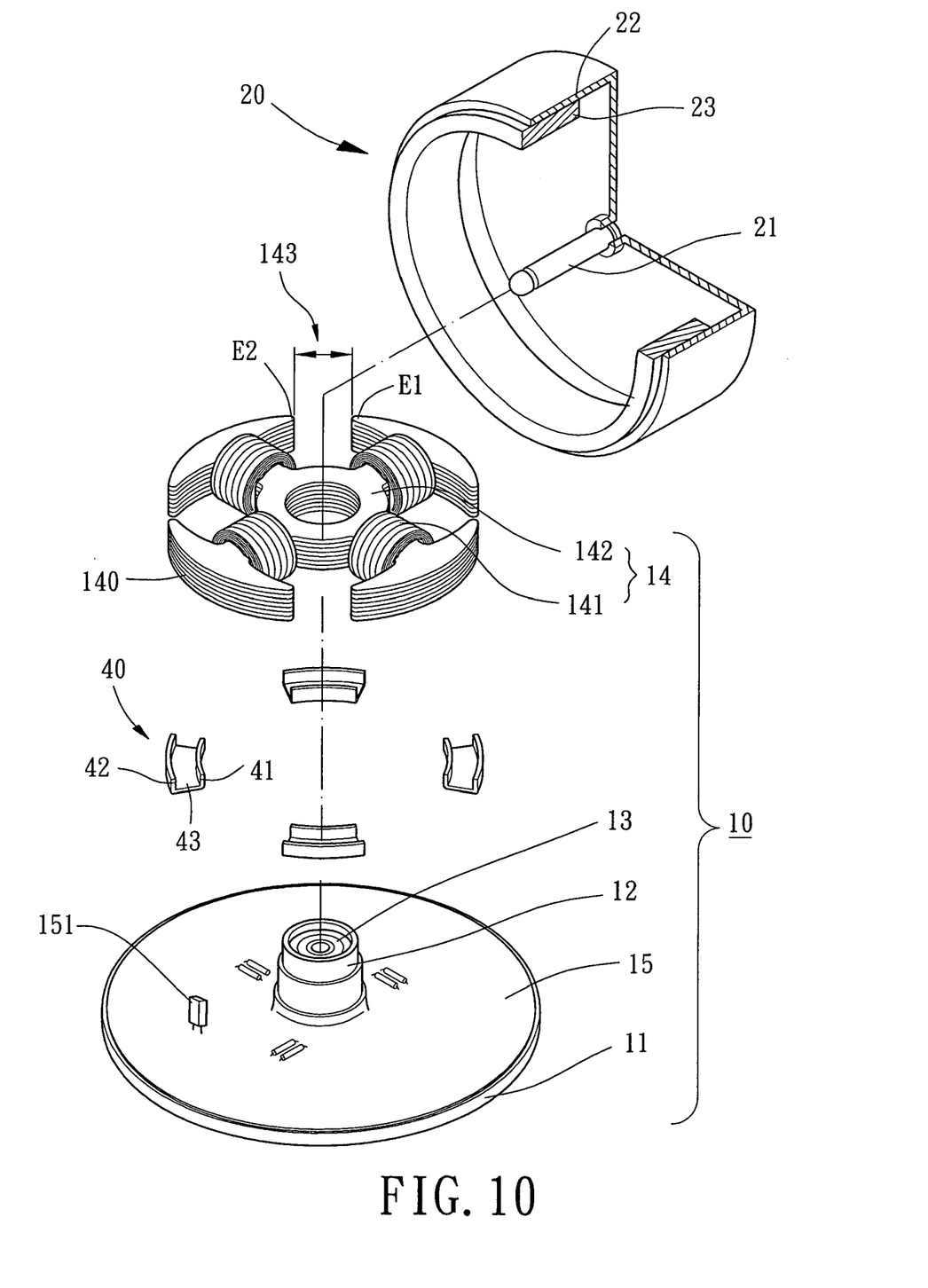
FIG. 10 is an exploded perspective view of a fourth embodiment of the motor in accordance with the present invention.
Figure 11:
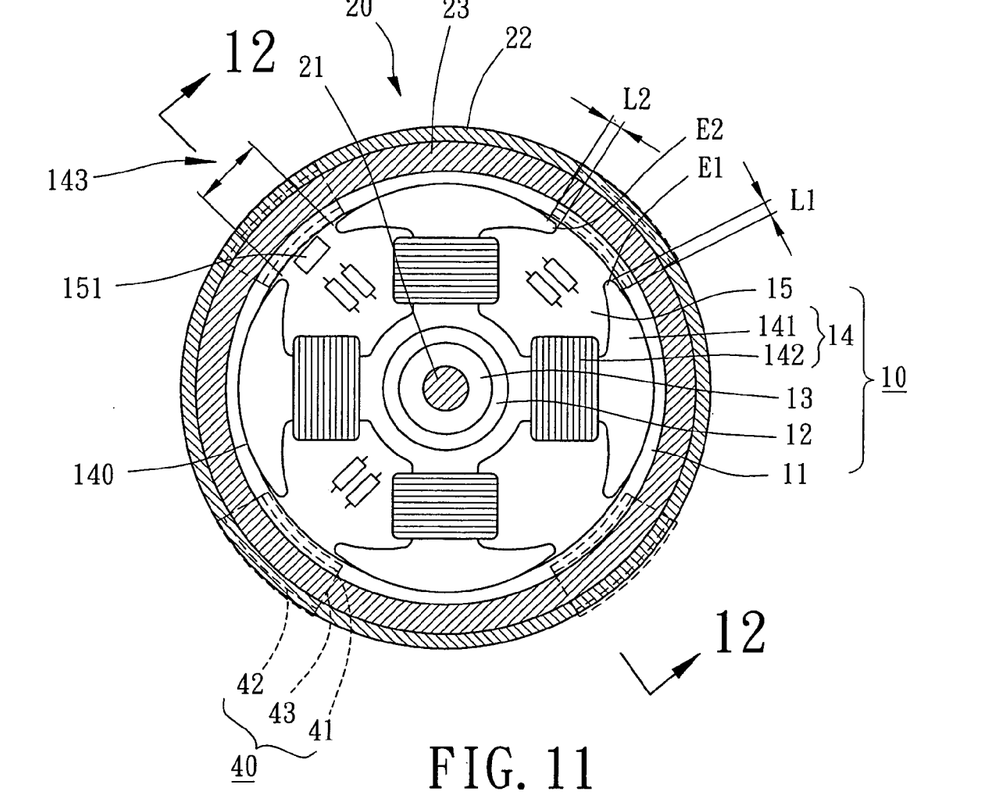
FIG. 11 is a sectional view of the motor in FIG. 10.
Figure 12:
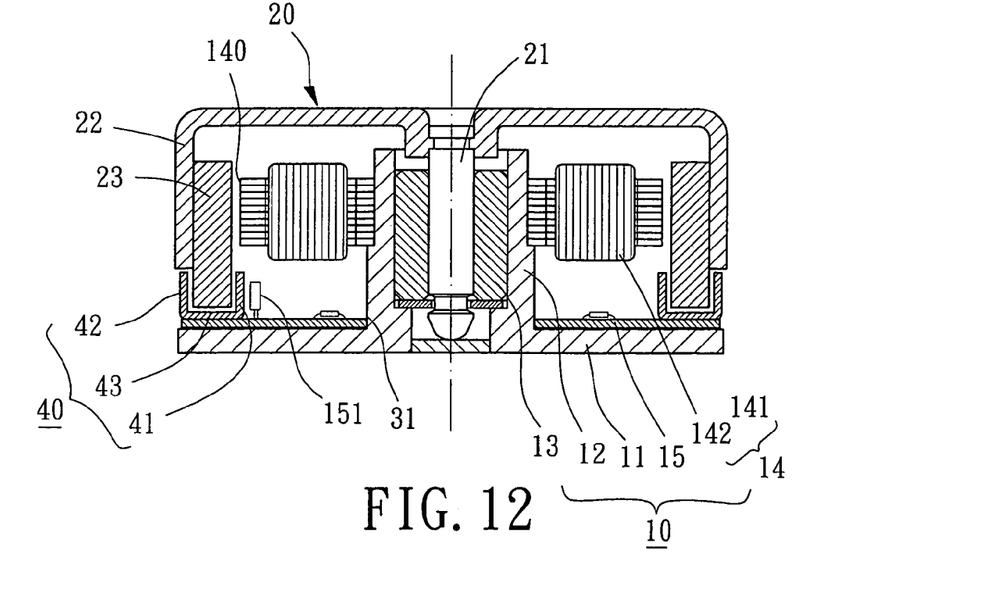
FIG. 12 is a sectional view taken along plane 12—12 in FIG. 11.

FIGS. 10 through 12 illustrate a fourth embodiment of the invention, wherein the balancing plate 30 is replaced with at least two (four in this embodiment) smaller balancing plates 40. Each balancing plate 40 is a substantially U-shaped metal plate having an inner conductive face 41, an outer conductive face 42, and a bottom conductive face 43. As illustrated in FIG. 12, a lower portion of the annular magnet 23 extends beyond a lower edge of the housing 22 of the rotor 20. The balancing plates 40 are fixed on the base 11 or the circuit board 15 of the fixed portion 10. Further, the inner conductive face 41, the outer conductive face 42, and the bottom conductive face 43 of each balancing plate 40 respectively face an outer periphery, an inner periphery, and a bottom face of the lower portion of the annular magnet 23. Further, each balancing plate 40 has a length not smaller than that of the gap 143. In a case that a span of each balancing plate 40 is greater than the length of the gap 143, the length of the balancing plate 40 is overlapped with a pair of the pole faces 140 of the pole plates 141 delimiting the associated gap 143 by a first overlapped length L1 and a second overlapped length L2 respectively. Preferably, at least one of the first overlapped length L1 and the second overlapped length L2 of each balancing plate 40 is smaller than ½ (more preferably ⅓) of the overall length of each pole face 140. Thus, an appropriate gap is provided between a pair of balancing plates 40 adjacent to each other. This embodiment provides advantages similar to those provided by the first embodiment.

Figure 13:
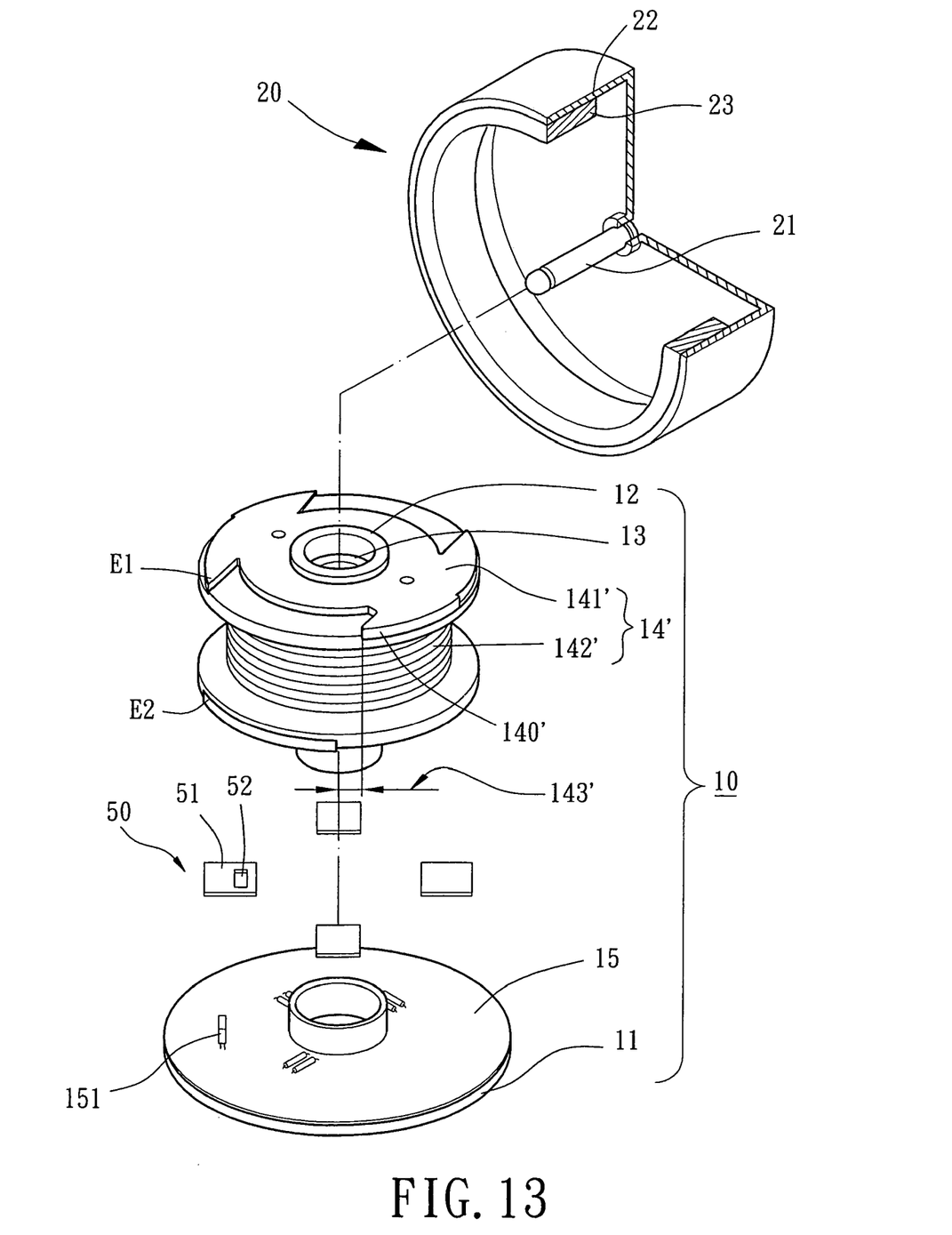
FIG. 13 is an exploded perspective view of a fifth embodiment of the motor in accordance with the present invention.
Figure 14:
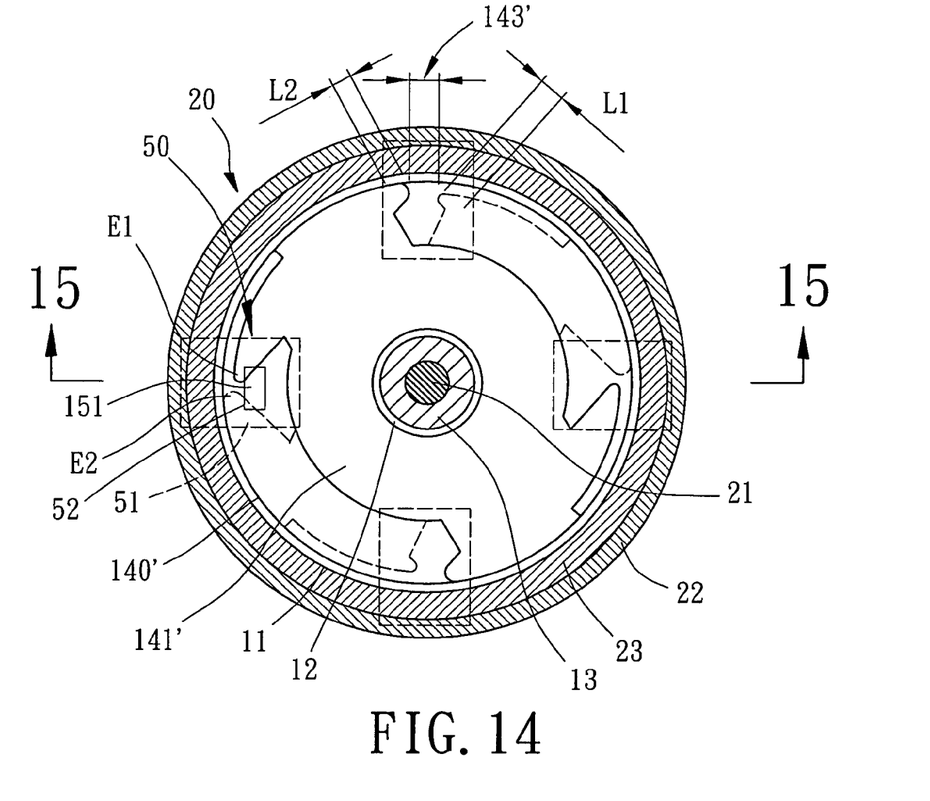
FIG. 14 is a sectional view of the motor in FIG. 13.
Figure 15:
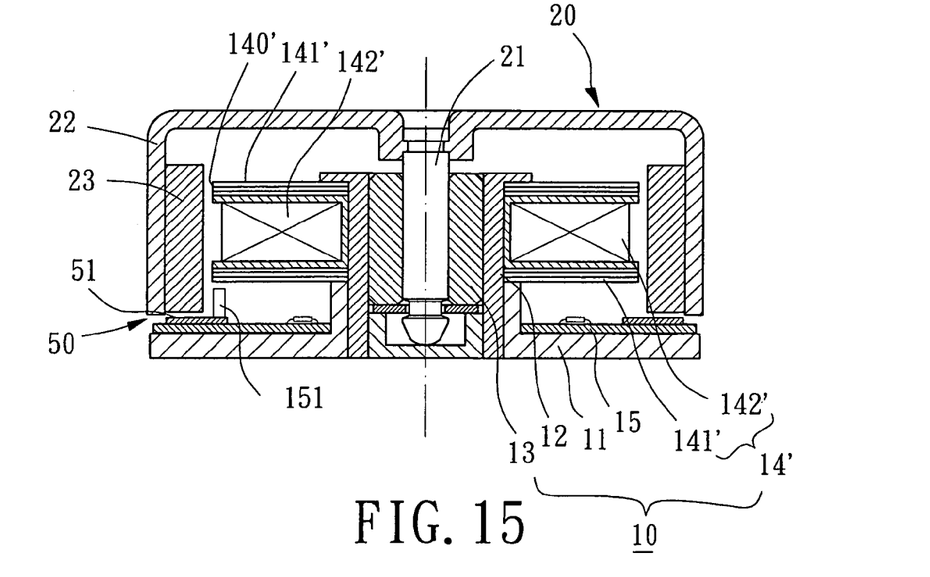
FIG. 15 is a sectional view taken along plane 15—15 in FIG. 14.

FIGS. 13 through 15 illustrate a fifth embodiment of the invention, wherein the balancing plate 30 is replaced with at least two (four in this embodiment) smaller balancing plates 50. Each balancing plate 50 is a substantially rectangular metal plate having a magnetically conductive face 51 on an upper face thereof. The fixed portion 10 includes a stator 14' with an axial winding. In particular, the stator 14' includes a plurality of pole plates 141' and a winding 142' axially wound between the pole plates 141', with each pole plate 141' extending radially to form a plurality of pole faces 140' and with a gap 143' defined between the pole plates 140'.

In assembly, the balancing plates 50 are fixed on the base 11 or the circuit board 15 of the fixed portion 10. Further, each balancing plate 50 is aligned with an associated gap 143' of the stator 14', with the magnetically conductive face 51 facing a bottom face of the annular magnet 23.

Each balancing plate 50 has a length not smaller than that of the gap 143. In a case that a span of each balancing plate 50 is greater than the length of the gap 143, the length of the balancing plate 50 is overlapped with a pair of the pole faces 140 of the pole plates 141 delimiting the associated gap 143 by a first overlapped length L1 and a second overlapped length L2 respectively. Preferably, at least one of the first overlapped length L1 and the second overlapped length L2 of each balancing plate 50 is smaller than ½ (more preferably ⅓) of the overall length of each pole face 140. Thus, an appropriate gap is provided between a pair of balancing plates 50 adjacent to each other. This embodiment provides advantages similar to those provided by the first embodiment. Further, at least one of the balancing plates 50 includes a notch 52. In assembly, the sensor 151 of the circuit board 150 is preferably aligned with the notch 52. When the rotor 20 turns, the sensor 151 detects the change of magnetism by the angular position of the notch 52 and a signal is output to the control circuit of the circuit board 15.

While the principles of this invention have been disclosed in connection with specific embodiments, it should be understood by those skilled in the art that these descriptions are not intended to limit the scope of the invention, and that any modification and variation without departing the spirit of the invention is intended to be covered by the scope of this invention defined only by the appended claims.

What is claimed is:

1. A motor comprising:
   a fixed portion including a stator, the stator including at least one winding and at least one pole plate, said at least one pole plate extending to form a plurality of pole faces, with a gap being defined between a pair of the pole faces adjacent to each other, said at least one winding being electrically energized and said energized winding magnetically inducting said pole faces for creating alternating magnetic fields;
   a rotor including a shaft and an annular magnet, the shaft rotatably extending through the fixed portion, the annular magnet being mounted to an inner periphery of the rotor and facing said pole faces of the stator; and
   at least one balancing plate mounted on the fixed portion, said at least one balancing plate including at least two magnetically conductive faces that are respectively aligned with the gaps of the stator and that are spaced from each other, each said magnetically conductive face having a length not smaller than that of an associated one of the gaps such that no portion of the magnetically conductive face is inserted into the respective gaps, said pole faces facing at least one face of the annular magnet;
   wherein when the rotor turns, a magnetic field of the annular magnet of the rotor magnetically actuates the alternating magnetic fields created by the stator, and is further attracted to said at least two magnetically conductive faces for inductive cooperation therewith to thereby maintain rotational balance of the rotor.

2. The motor as claimed in claim 1, wherein the fixed portion includes an axial tube, and wherein said at least one balancing plate is a disc with a central hole and mounted around the axial tube.

3. The motor as claimed in claim 2, wherein the at least two magnetically conductive faces extend from a circumference of the disc and face the inner periphery of the annular magnet.

4. The motor as claimed in claim 2, wherein said at least one balancing plate includes a plurality of notches aligned with the pole faces, and wherein said at least one balancing plate includes a plurality of extensions respectively aligned with the gaps of the stator.

5. The motor as claimed in claim 1, wherein the stator includes one of radial winding and axial winding.

6. A motor comprising,
   a fixed portion including a stator, the stator including at least one winding and at least one pole plate, said at least one pole plate extending to form a plurality of pole faces, with a gap being defined between a pair of the pole faces adjacent to each other, said at least one winding being electrically energized and said energized winding magnetically inducting said pole faces for creating alternating magnetic fields;
   a rotor including a shaft and an annular magnet, the shaft rotatably extending through the fixed portion, the annular magnet being mounted to an inner periphery of the rotor and facing said pole faces of the stator; and
   at least one balancing plate mounted on the fixed portion, said at least one balancing plate including at least two magnetically conductive faces that are respectively aligned with the gaps of the stator and that are spaced from each other, each said magnetically conductive face having a length not smaller than that of an associated one of the gaps, said pole faces facing at least one face of the annular magnet;
   wherein the fixed portion further includes a circuit board with an underside, and wherein said at least one balancing plate is in intimate contact with the underside of the circuit board; and wherein when the rotor turns, a magnetic field of the annular magnet of the rotor magnetically actuates the alternating magnetic fields created by the stator, and is further attracted to said at least two magnetically conductive faces for inductive cooperation therewith to thereby maintain rotational balance of the rotor.

7. A motor comprising,
   a fixed portion including a stator, the stator including at least one winding and at least one pole plate, said at least one pole plate extending to form a plurality of pole faces, with a gap being defined between a pair of the pole faces adjacent to each other, said at least one winding being electrically energized and said energized winding magnetically inducting said pole faces for creating alternating magnetic fields;
   a rotor including a shaft and an annular magnet, the shaft rotatably extending through the fixed portion, the annular magnet being mounted to an inner periphery of the rotor and facing said pole faces of the stator; and
   at least one balancing plate mounted on the fixed portion, said at least one balancing plate including at least two magnetically conductive faces that are respectively aligned with the gaps of the stator and that are spaced from each other, each said magnetically conductive face having a length not smaller than that of an associated one of the gaps, said pole faces facing at least one face of the annular magnet;

wherein the fixed portion further includes a circuit board with a top side, and wherein said at least one balancing plate is in intimate contact with the top side of the circuit board; and wherein when the rotor turns, a magnetic field of the annular magnet of the rotor magnetically actuates the alternating magnetic fields created by the stator, and is further attracted to said at least two magnetically conductive faces for inductive cooperation therewith to thereby maintain rotational balance of the rotor.

8. A motor comprising,
a fixed portion including a stator, the stator including at least one winding and at least one pole plate, said at least one pole plate extending to form a plurality of pole faces, with a gap being defined between a pair of the pole faces adjacent to each other, said at least one winding being electrically energized and said energized winding magnetically inducting said pole faces for creating alternating magnetic fields;
a rotor including a shaft and an annular magnet, the shaft rotatably extending through the fixed portion, the annular magnet being mounted to an inner periphery of the rotor and facing said pole faces of the stator; and
at least one balancing plate mounted on the fixed portion, said at least one balancing plate including at least two magnetically conductive faces that are respectively aligned with the gaps of the stator and that are spaced from each other, each said magnetically conductive face having a length not smaller than that of an associated one of the gaps, said pole faces facing at least one face of the annular magnet;
wherein each said magnetically conductive face extends across an associated one of the gaps and two mutually facing ends respectively of an associated pair of the pole faces adjacent to each other, with an associated one of the gaps being delimited between the two mutually facing ends; and wherein when the rotor turns, a magnetic field of the annular magnet of the rotor magnetically actuates the alternating magnetic fields created by the stator, and is further attracted to said at least two magnetically conductive faces for inductive cooperation therewith to thereby maintain rotational balance of the rotor.

9. The motor as claimed in claim 8, wherein a length of each said magnetically conductive face overlaps with an associated pair of the pole faces delimiting the associated gap by a first overlapped length and a second overlapped length, at least one of the first overlapped length and the second overlapped length is smaller than ½ of an overall length of each said pole face.

10. A motor comprising,
a fixed portion including a stator, the stator including at least one winding and at least one pole plate, said at least one pole plate extending to form a plurality of pole faces, with a gap being defined between a pair of the pole faces adjacent to each other, said at least one winding being electrically energized and said energized winding magnetically inducting said pole faces for creating alternating magnetic fields;
a rotor including a shaft and an annular magnet, the shaft rotatably extending through the fixed portion, the annular magnet being mounted to an inner periphery of the rotor and facing said pole faces of the stator; and
at least one balancing plate mounted on the fixed portion, said at least one balancing plate including at least two magnetically conductive faces that are respectively aligned with the gaps of the stator and that are spaced from each other, each said magnetically conductive face having a length not smaller than that of an associated one of the gaps, said pole faces facing at least one face of the annular magnet;
said at least one balancing plate including a plurality of notches aligned with the pole faces, and said at least one balancing plate including a plurality of extensions respectively aligned with the gaps of the stator;
wherein the magnetically conductive faces are respectively located on upper faces of distal ends of the extensions, and the magnetically conductive faces face a bottom face of the annular magnet of the rotor; and wherein when the rotor turns, a magnetic field of the annular magnet of the rotor magnetically actuates the alternating magnetic fields created by the stator, and is further attracted to said at least two magnetically conductive faces for inductive cooperation therewith to thereby maintain rotational balance of the rotor.

11. The motor as claimed in claim 10, wherein each said magnetically conductive face extends across an associated one of the gaps and two mutually facing ends respectively of an associated pair of the pole faces adjacent to each other, with an associated one of the gaps being delimited between the two mutually facing ends.

12. The motor as claimed in claim 10, wherein a length of each magnetically conductive face overlaps with an associated pair of the pole faces delimiting the associated gap by a first overlapped length and a second overlapped length, at least one of the first overlapped length and the second overlapped length is smaller than ½ of an overall length of each said pole face.

13. A motor comprising,
a fixed portion including a stator, the stator including at least one winding and at least one pole plate, said at least one pole plate extending to form a plurality of pole faces, with a gap being defined between a pair of the pole faces adjacent to each other, said at least one winding being electrically energized and said energized winding magnetically inducting said pole faces for creating alternating magnetic fields;
a rotor including a shaft and an annular magnet, the shaft rotatably extending through the fixed portion, the annular magnet being mounted to an inner periphery of the rotor and facing said pole faces of the stator; and
at least one balancing plate mounted on the fixed portion, said at least one balancing plate including at least two magnetically conductive faces that are respectively aligned with the gaps of the stator and that are spaced from each other, each said magnetically conductive face having a length not smaller than that of an associated one of the gaps, said pole faces facing at least one face of the annular magnet;
wherein the number of said at least one balancing plate is at least two, each of said at least two balancing plates being U-shaped and including an inner magnetically conductive face, an outer magnetically conductive face, and a lower magnetically conductive face; and wherein when the rotor turns, a magnetic field of the annular magnet of the rotor magnetically actuates the alternating magnetic fields created by the stator, and is further attracted to said at least two magnetically conductive faces for inductive cooperation therewith to thereby maintain rotational balance of the rotor.

14. The motor as claimed in claim 13, wherein the fixed portion includes a circuit board, said at least two balancing plates being mounted on the circuit board and respectively aligned with the gaps of the stator, with the inner magnetically conductive face, the outer magnetically conductive face, and the lower magnetically conductive face of each of said at least two balancing plates respectively facing the inner periphery, an outer periphery, and a bottom face of the annular magnet of the rotor.

15. The motor as claimed in claim 13, wherein the fixed portion includes a base, said at least two balancing plates being mounted on the base and respectively aligned with the gaps of the stator, with the inner magnetically conductive face, the outer magnetically conductive face, and the lower magnetically conductive face of each of said at least two balancing plates respectively facing the inner periphery, an outer periphery, and a bottom face of the annular magnet of the rotor.

16. The motor as claimed in claim 13, wherein each of the inner magnetically conductive face, the outer magnetically conductive face, and the lower magnetically conductive face of each of said at least two balancing plates extend across an associated one of the gaps and two mutually facing ends respectively of an associated pair of the pole faces adjacent to each other, with an associated one of the gaps being delimited between the mutually facing ends.

17. The motor as claimed in claim 13, wherein a length of each of the inner magnetically conductive face, the outer magnetically conductive face, and the lower magnetically conductive face of each of said at least two balancing plates overlaps with an associated pair of the pole faces delimiting the associated gap by a first overlapped length and a second overlapped length, at least one of the first overlapped length and the second overlapped length being smaller than ½ of an overall length of each said pole face.

18. A motor comprising,
a fixed portion including a stator, the stator including at least one winding and at least one pole plate, said at least one pole plate extending to form a plurality of pole faces, with a gap being defined between a pair of the pole faces adjacent to each other, said at least one winding being electrically energized and said energized winding magnetically inducting said pole faces for creating alternating magnetic fields;
a rotor including a shaft and an annular magnet, the shaft rotatably extending through the fixed portion, the annular magnet being mounted to an inner periphery of the rotor and facing said pole faces of the stator; and
at least one balancing plate mounted on the fixed portion, said at least one balancing plate including at least two magnetically conductive faces that are respectively aligned with the gaps of the stator and that are spaced from each other, each said magnetically conductive face having a length not smaller than that of an associated one of the gaps, said pole faces facing at least one face of the annular magnet;
wherein the number of said at least one balancing plate is at least two, each of said at least two balancing plates being rectangular and having an upper side on which the magnetically conductive faces are formed; and wherein when the rotor turns, a magnetic field of the annular magnet of the rotor magnetically actuates the alternating magnetic fields created by the stator, and is further attracted to said at least two magnetically conductive faces for inductive cooperation therewith to thereby maintain rotational balance of the rotor.

19. The motor as claimed in claim 18, wherein the fixed portion includes a circuit board, said at least two balancing plates being mounted on the circuit board and respectively aligned with the gaps of the stator, with the magnetically conductive faces facing a bottom face of the annular magnet of the rotor.

20. The motor as claimed in claim 18, wherein the fixed portion includes a base, said at least two balancing plates being mounted on the base and respectively aligned with the gaps of the stator, with the magnetically conductive faces facing a bottom face of the annular magnet of the rotor.

21. The motor as claimed in claim 18, wherein each of said at least two balancing plates extends across an associated one of the gaps and two mutually facing ends respectively of an associated pair of the pole faces adjacent to each other, with an associated one of the gaps being delimited between the mutually facing ends.

22. The motor as claimed in claim 21, wherein a length of each of said at least two balancing plates overlaps with an associated pair of the pole faces delimiting the associated gap by a first overlapped length and a second overlapped length, at least one of the first overlapped length and the second overlapped length being smaller than ½ of an overall length of each said pole face.

* * * * *